United States Patent [19]

Dahlgren et al.

[11] Patent Number: 4,980,184

[45] Date of Patent: Dec. 25, 1990

[54] METHOD AND AGENT FOR PRESERVATION OF HAY

[75] Inventors: Sven-Eric Dahlgren, Landskrona; Claes Ericsson, Bjuv; Torsten Nilsson, Helsingborg, all of Sweden

[73] Assignee: Boliden Kemi Aktiebolag, Helsingborg, Sweden

[21] Appl. No.: 278,534

[22] PCT Filed: Mar. 30, 1988

[86] PCT No.: PCT/SE88/00156

§ 371 Date: Nov. 22, 1988

§ 102(e) Date: Nov. 22, 1988

[87] PCT Pub. No.: WO88/07332

PCT Pub. Date: Oct. 6, 1988

[30] Foreign Application Priority Data

Feb. 4, 1987 [SE] Sweden ................................ 8701372

[51] Int. Cl.$^5$ ................................................ A23K 3/00
[52] U.S. Cl. .................................... 426/335; 426/321; 426/636
[58] Field of Search ................... 426/69, 74, 321, 335, 426/636, 326

[56] References Cited

U.S. PATENT DOCUMENTS

| | | |
|---|---|---|
| 1,013,568 | 1/1912 | Sharpe, Jr. .......................... 426/321 |
| 1,603,136 | 10/1926 | Messmer . |
| 1,935,754 | 11/1933 | Virtanen . |
| 3,202,514 | 8/1965 | Burgess et al. ........................ 426/74 |
| 3,996,386 | 12/1976 | Malkki et al. ....................... 426/321 |
| 4,344,971 | 8/1982 | Garbutt ............................... 426/102 |
| 4,448,707 | 5/1984 | Fenn ..................................... 426/321 |
| 4,664,861 | 5/1987 | Pritikin et al. ..................... 426/105 |

FOREIGN PATENT DOCUMENTS 0219997 10/1986 European Pat. Off. .

Primary Examiner—Donald E. Czaja
Assistant Examiner—D. Workman
Attorney, Agent, or Firm—Burns, Doane, Swecker & Mathis

[57] ABSTRACT

The present invention relates to a method for the preservation of hay and other forages for animals and is characterized by distributing to the forages in finely dispersed form and in active amounts to block the growth of fungi and any other biological activity an agent with the ability to achieve a high osmotic pressure in the humidity of the forage. The so treated forage is then brought to storage.

The agent according to the invention is a concentrated water solution of an electrolyte with high water solubility stable at actual working temperature, which does not contain elements harmful for animals or humans.

7 Claims, 1 Drawing Sheet

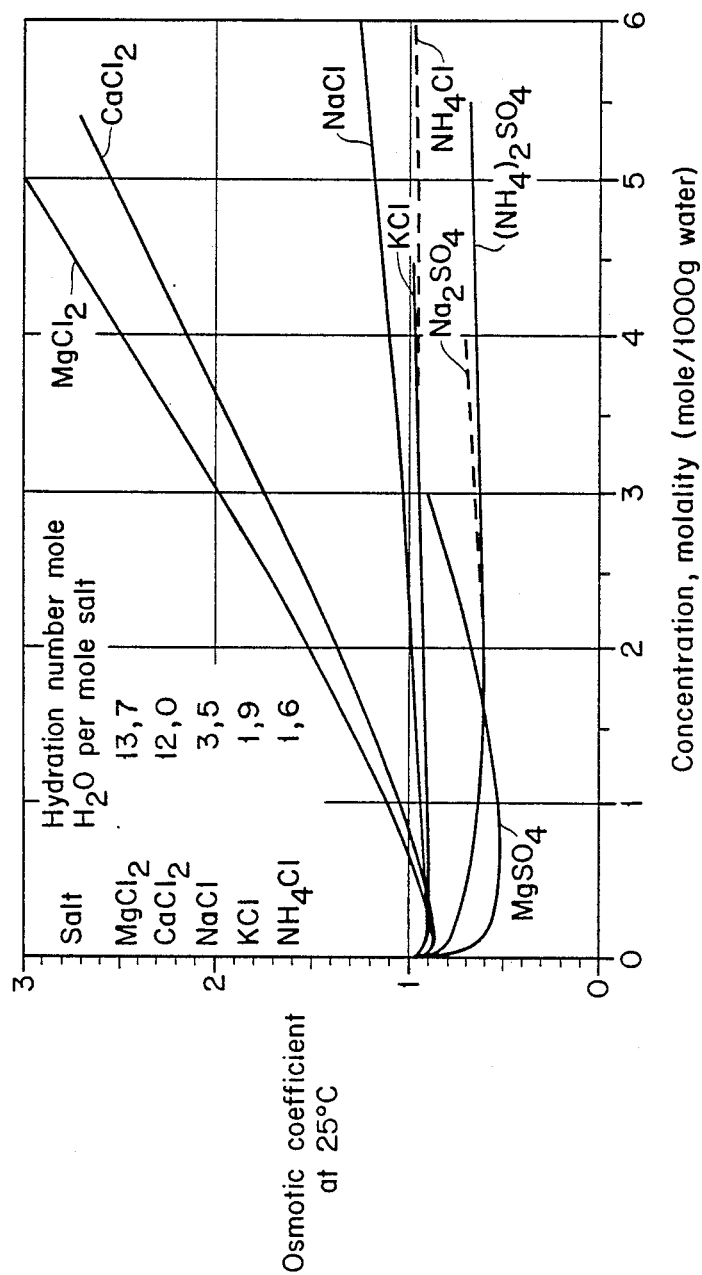

METHOD AND AGENT FOR PRESERVATION OF HAY

This invention relates to a method for the preservation of hay and other dried forages for animals, especially ruminants and horses. The invention furthermore relates to agents to accomplish the method.

The treatment of pasture feed to hay of high quality often causes problems:

Harvesting may be problematic because of rain and humid weather.

It may be difficult to dry the hay because of rain and humid weather.

Badly harvested and badly dried hay is difficult to store.

Badly stored hay is from many aspects condemnable for the animals, who are supposed to eat it, because harmful fungi deteriorate the nutritional value, further they may be noxious to the animals.

It is thus of utmost importance to obtain a properly stored hay. The risk for storage damage increases by harvesting using modern technology, e.g. big bales. Such bales are compact and difficult to dry afterwards. Earlier, hay was dried preponderatingly on hay racks. Normally a dry matter (DM) content of 85% was obtained. Hay does inevitably carry a field flora as well as a storage flora of mould spores. To prevent these from developing sodium chloride (common salt) in an amount of 10–15 kg per ton dry hay Was added by hand when loading in the loft or in the barn. Furthermore the salt improved the palatability. Unfortunately storage moulds grow at lower water content than the field moulds and are copious in their spore forming ability. The risk, that the mould spores shall develop, increases with increased moisture content in the hay.

Today's technique, where the hay is dried in strings on the ground including a couple of turnings and the string is picked up and pressed into bales or big bales, has heavily increased the risk for mould damage of the hay. The farmer is to a considerably higher degree than before in the hands of the powers of the weather and is difficult to obtain the same high dry matter content achieved by rack drying and by loft drying. The addition of salt in connection with string pick-up is inefficient because of nonhomogeneous distribution in the hay. Practical experience has shown, that even if a small part is untreated and mould formation occurs therein, the whole lot must be rejected. Mold formation causes a series of problems:

The nutritional value and energy content is deteriorated.

Mould spores in great amounts irritate the respiratory pathways of the animals as well as of the cattlemen and may cause e.g. pneumonia.

Moulds affect the conditions in the digested path of the animals.

Mould toxins may cause e.g. chronic kidney damages, abortion and deteriorated feed conversion.

Mould toxins are transferred into the milk and causes problems in dairying. Such milk must in principle be rejected.

Mould formation thus causes environmental problems for the cattlemen and influences on the health of the animals as well as on the milk. In addition there are the economic consequences. If conditions for mould formation are on hand, degradation of organic matter takes place under heat formation and formation of carbon dioxide and water, which accelerates the mould formation. One says, that the hay is "breathing". Most obvious this is in big bales.

For the reasons stated above and common experience obtained so far, the farmers are advised not to use chemical preservatives for hay. It is considered, that homogeneous addition and therefore acceptable results are from a practical point of view impossible to reach. See e,g. the brochure "Something about mould poisons" issued by the Swedish Association of Dairies, 1986.

It has, however, surprisingly been shown possible to effect an efficient preservation without the serious problems stated above. With this aim, the present invention shows a procedure as well as an agent which are hereinafter set forth in greater particularity.

The invention idea is to prevent any form of fermentative and other biological activity unlike the silage process, wherein newly harvested forages in undried form are treated in order to obstruct any butyric and acetic acid formation by fermentation and to create favourable conditions for lactic acid formation.

By treatment according to the invention, the forage is supplied with an agent with the ability to give a high osmotic pressure in the moisture of the forage. The agent is supplied in finely dispersed form (atomized) in an amount sufficient to block the growth of the harmful fungi. The forage so treated is then taken to storage. The agent is suitably supplied in the field in connection with picking up from the ground or transporting to storage, preferably by spraying through a nozzle.

The agent according to the invention for accomplishing the treatment according to the invention is essentially a concentrated water solution of an electrolyte possessing high water solubility, stable at actual working temperatures, which does not contain elements which might be harmful to animals or humans.

Preferably the electrolyte is a chloride of alkaline-earth metals, especially calcium and/or magnesium chlorides are preferred.

To improve the stability of the solution at working temperatures up to 10% propylene glycol, glycerol or other additive for decreasing the crystallization temperature may be added to the water solution. This is of importance as concentrated electrolyte solutions are used, but precipitation e.g. by crystallization must be avoided, as this would block the spraying equipment and make further application impossible.

The invention will now be described more in detail, partly in an example of application and with reference to the attached figure, a diagram showing the osmotic coefficient as a function of the concentration of electrolytes. All percentages here and before are by weight. If in connection with the picking up a uniform distribution of electrolyte in suitable quantity is effected in the hay, the so obtained osmotic pressure preVents the flora of mould spores from developing and prevents any fermentation processes from occuring. A uniform distribution is according to the invention effected by spraying a concentrated solution of a suitable electrolyte in finely dispersed form. Such a solution does not segregate, but adheres to the hay because of its stickiness, which increases with increased concentration of the electrolyte solution. In addition further penetration and distribution occurs by diffusion. Such an electrolyte must fulfill a series of demands:

Must not be composed of material toxic or harmful for the animals

Must not contain injurious content of certain impurities, e.g. heavy metals

Concentrated solutions should be possible to achieve without risk of crystallization or precipitation at temperatures encountered in field conditions.

Shall give a high osmotic pressure.

For a series of possible electrolytes the relationship between concentration and osmotic coefficient is given in the attachaed figure. It shows, that the preferred electrolytes magnesium chloride and calcium chloride markedly differ from the other electrolytes. The explanation behind this is, that magnesium chloride and calcium chloride in water solution are surrounded by a shell of a great number of attached water molecules (high hydration number) thereby decreasing the amount of free mobile water molecules. The other indicated electrolytes have a low hydration number and therefore possess low osmotic coefficients. Furthermore magnesium, calcium and chloride are essential mineral components for the animals.

EXAMPLE

On a windrow field dried hay have 75% dry matter content, which was pressed into bales, no treatment and treatment in connection with the pressing by spraying 20 litres per ton hay of a solution containing 17.1% $MgCl_2$ and 23.3% $CaCl_2$ were compared.

Evaluation was made after 3 months storage.

|  | treated | untreated |
|---|---|---|
| visual inspection | no mould formation | extensive mould formation |
| ratio $\frac{\text{non digestable protein}}{\text{total protein}}$ | 0.068 | 0.116 |

We claim:

1. A method of preserving hay and other dried forages for animals comprising distributing onto the forage in finely dispersed form an agent having a high osmotic pressure in the humidity of the forage, said agent being present in an amount sufficient to block the growth of fungi, and storing the thus treated forage, wherein the agent is a concentrated aqueous solution of an electrolyte having high water solubility, which is stable under the temperatures encountered upon distribution and storage and which does not contain elements harmful to animals or humans, said aqueous solution contains from 25 to 50% by weight of the electrolyte selected from calcium chloride, magnesium chloride and mixtures thereof, said aqueous solution further contains an additive for decreasing the crystallization temperature of the aqueous solution in an amount up to 10% by weight selected from propylene glycol, glycerol and mixtures thereof.

2. The method of claim 1 wherein the agent is distributed onto the forage upon collection from the ground in the field.

3. The method of claim 1 wherein the agent is distributed onto the forage as the forage is being transported to storage.

4. The method of claim 1 wherein the agent is distributed through a nozzle.

5. The method of claim 1 wherein the agent is distributed through an atomizer.

6. The method of claim 1 wherein the aqueous solution contains about 35% by weight of the electrolyte.

7. An agent for the preservation of hay and other dried forages comprising a concentrated aqueous solution of an electrolyte having high water solubility, which is stable under the temperatures encountered upon distribution and storage, and which does not contain elements harmful to animals or humans, wherein the aqueous solution contains from 25 to 50% by weight of the electrolyte selected from calcium chloride, magnesium chloride and mixtures thereof, wherein the aqueous solution further contains an additive for decreasing the crystallization temperature of the aqueous solution in an amount up to 10% by weight selected from propylene glycol, glycerol and mixtures thereof.

* * * * *